(12) United States Patent
Rhinehart

(10) Patent No.: US 11,008,096 B1
(45) Date of Patent: May 18, 2021

(54) REDUNDANCY MANAGEMENT FOR ROTOR SYSTEMS WITH INDIVIDUAL BLADE CONTROL

(71) Applicant: Matthew Rhinehart, Saint Inigoes, MD (US)

(72) Inventor: Matthew Rhinehart, Saint Inigoes, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/833,948

(22) Filed: Mar. 30, 2020

(51) Int. Cl.
*B64C 27/00* (2006.01)
*B64C 27/57* (2006.01)
*B64C 27/72* (2006.01)

(52) U.S. Cl.
CPC .............. *B64C 27/57* (2013.01); *B64C 27/72* (2013.01); *B64C 2027/7205* (2013.01)

(58) Field of Classification Search
CPC .. B64C 27/57; B64C 27/72; B64C 2027/7205
See application file for complete search history.

(56) References Cited

U.S. PATENT DOCUMENTS 7,615,908 B2 * 11/2009 Yamamuro ............... H02K 9/28
310/228
8,628,042 B2 * 1/2014 Imbert ................... B64D 15/14
244/134 D

* cited by examiner

*Primary Examiner* — Ian Jen
(74) *Attorney, Agent, or Firm* — Mark O. Glut; NAWCAD

(57) ABSTRACT

A method and system for redundancy management of an individual blade controller rotor system is provided. The blade controller rotor system has a control computer in a stationary frame and multiple blade controllers in a rotary frame. Each of the blade controllers corresponds to a blade of a rotor system. A slip ring interfaces the stationary frame and the rotary frame. Data is transferred, via the slip ring, between each blade controller and the control computer. Each blade controller accepts and transmits information, including historical blade positions, from the other blade controllers. Each blade controller can determine a valid position for its blade based on a historical position of another blade.

10 Claims, 3 Drawing Sheets

US 11,008,096 B1

REDUNDANCY MANAGEMENT FOR ROTOR SYSTEMS WITH INDIVIDUAL BLADE CONTROL

STATEMENT OF GOVERNMENT INTEREST

The invention described herein may be manufactured and used by or for the Government of the United States of America for governmental purposes without payment of any royalties thereon or therefor.

BACKGROUND

Traditional rotor systems, such as those found in helicopters and wind turbines, encompass several rotary blades and a control system. However, significant improvements can be made to the rotor system by adopting individual blade control (IBC), such as to the maneuverability, performance, structural load, and acoustic signature. Rotorcraft have not adopted IBC in regular use partly due to insufficient supporting safety technologies.

Where IBC has been implemented in rotorcraft, traditional control systems are left intact as a safety backup. However, this redundant configuration poses limitations, both physical and cost, on the system. Without the redundancy, current IBC systems can experience catastrophic failure. As a result, there is a need for a technology that provides redundancy management for IBC rotor systems to decrease the likelihood of loss of blade command position.

SUMMARY

In general, in one aspect, a method for redundancy management of an individual blade control rotor system, the method comprising: a series of control time steps for the individual blade control system, wherein the individual blade control system comprises a control computer and a plurality of blades, and wherein during each time step: a blade controller of a local blade queries a first blade position from a control computer; in response to an invalid first blade position, the blade controller of the local blade determines a lead blade; the blade controller of the local blade queries a second blade position from a blade controller of the lead blade.

In general, in another aspect, a system for redundancy management of individual blade controller rotor system, the system comprising: a stationary frame and a rotary frame; the stationary frame comprises at least one control computer; the rotary frame comprises a rotating rotor hub and a plurality of blade controllers; and a slip ring providing an interface between the stationary frame and the rotary frame, where data is transferred amongst the plurality of blade controllers, and wherein data is transferred between the plurality of blade controllers and the at least one control computer. Wherein, each blade controller of the plurality of blade controllers accepts and transmits information from the plurality of blade controllers. Further, the position of a first blade controller of the plurality of blade controllers is determined from a historical position of a second blade controller of the plurality of blade controllers.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Embodiments of the present invention recognize the benefits of individual blade control (IBC) over traditional rotor systems. Embodiments of the present invention recognize that IBC improvements over traditional rotor systems include increased maneuverability, improved system performance, reduced structural loads, and a lower acoustic signature. However, embodiments of the present invention also recognize the potential for catastrophic loss where individual blades lose communication with the central controller.

Embodiments of the present invention provide a method for IBC, allowing for safe and effective control of the individual blades on a rotor hub. Embodiments of the present invention provide motion control redundancy management for passing critical information between a stationary frame and a rotating frame of an IBC environment. In some embodiments, the redundancy management scheme provides substitute blade position commands when nominally provided blade position commands are otherwise unavailable. Embodiments of the present invention provide a method of IBC redundancy management that allows for graceful degradation of an IBC environment.

In the following detailed description, reference is made to the accompanying drawings, which show, by way of illustration, specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
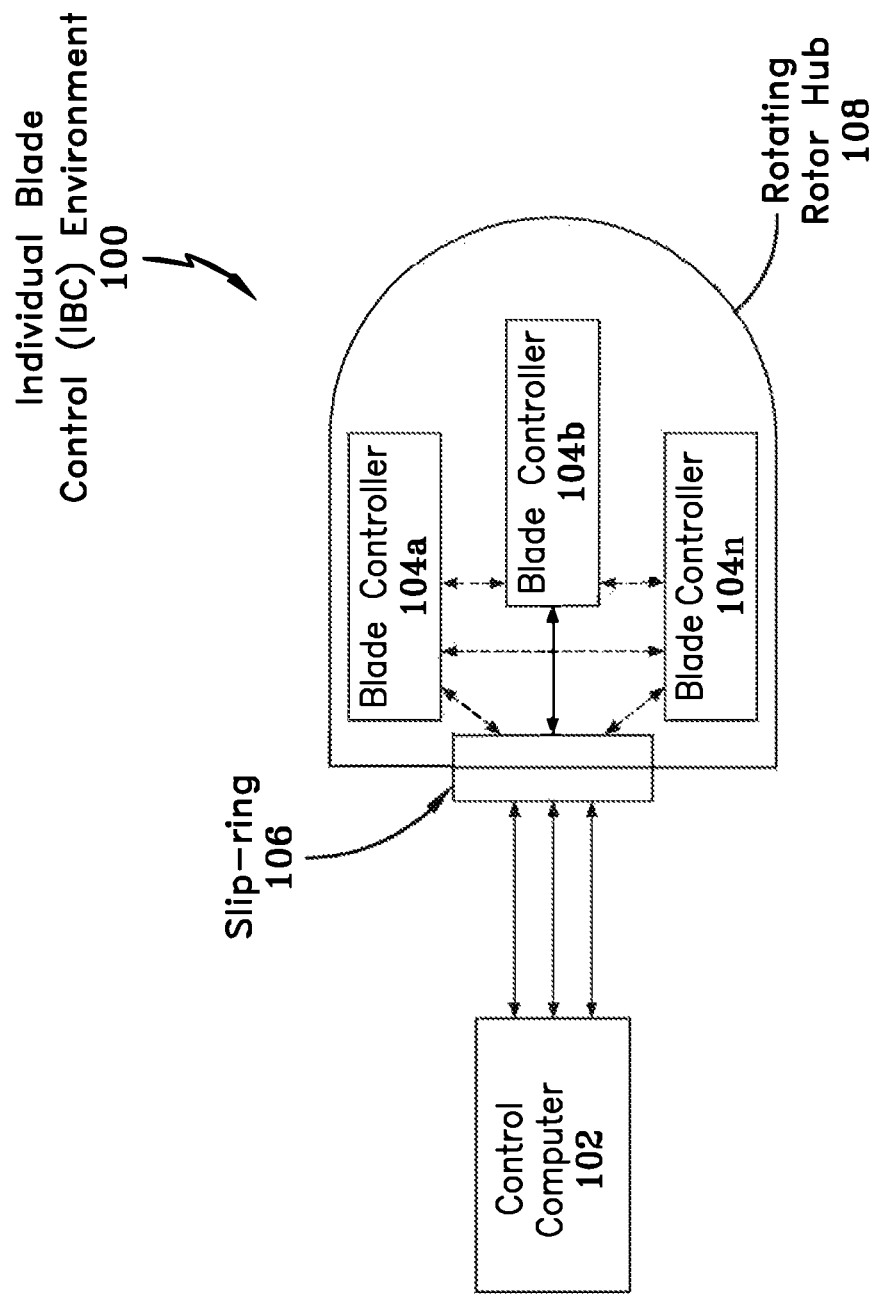
FIG. 1 is a block diagram of the hardware environment of an individual blade control architecture.

Turning now to the figures, FIG. 1 depicts a block diagram of the hardware embodiment of an individual blade control architecture. FIG. 1 depicts individual blade control environment 100. FIG. 1 is just one example of the hardware of an IBC environment, which illustrates the minimum required hardware to carry out the redundancy management method for IBC rotor systems. In other embodiments, individual blade control environment may encompass additional pieces of hardware.

Individual blade control (IBC) environment 100 has a stationary frame and a rotary frame. In some embodiments of IBC environment 100, components includes a control computer 102, at least two blades (not pictured), at least two blade controllers 104a and 104n, slip-ring 106, rotating rotor hub 108, and data busses (depicted by double headed arrows).

Control computer 102 is located in the stationary frame of IBC environment 100. In some embodiments, IBC environment 100 may contain more than one control computer 102. Control computer 102 may include internal and external hardware components. Control computer 102 sends commands to, and receives statuses from, blade controllers 104a and 104n via data busses. Control computer 102 performs method steps for control command logic 300.

Blade controllers 104a and 104n are located in the rotary frame of IBC environment 100. Each blade of IBC environment 100 contains a blade controller. For example, blade controller 104a is attached to a local blade, whereas blade controller 104n is attached to a lead blade. In some embodiments, blades of IBC environment 100 contain more than one blade controller. For example, in a rotary system with three blades, IBC environment 100 contains at least three blade controllers.

Blade controllers 104a and 104n receive commands from control computer 102. In some embodiments, data sent by control computer 102 includes a blade position. Blade controller 104a sends status updates to and receives status updates from each blade controller in IBC environment 100, for example, blade controller 104n. Likewise, blade controller 104n sends status updates to and receives status updates from blade controller 104a. In some embodiments, data sent by blade controller 104a includes the current azimuth of the local blade and blade commanded blade position. In some embodiments, data received by blade controller 104a includes the current azimuth of the lead blade and blade commanded position. Status updates are sent and received via data busses. Blade controllers 104a-104n perform method steps for blade command logic 200.

Slip ring 106 is located between the stationary frame and the rotary frame of IBC environment 100. In some embodiments, slip ring 106 is an electromechanical device that allows transmission of data signals from the stationary frame to the rotary frame. In other embodiments, slip ring 106 utilizes wireless communication to transmit data signals from the stationary frame to the rotary frame.

Rotating rotor hub 108 is located in the rotary frame of IBC environment 100. Rotating rotor hub 108 houses each blade of IBC environment 100. In some embodiments, rotating rotor hub 108 contains one or more servos to move each blade of IBC environment 100. Rotating rotor hub 108 permits the pitch of each blade in IBC environment 100 to be controlled independently of the other blades.

Data busses, depicted as double-ended dashed arrows, are any combination of connections and protocols that support communication between control computer 102 and blade controllers 104a-104n. Data busses permit the flow of information between control computer 102 and blade controllers 104a thru 104n.

Generally, control computer 102 houses and implements one portion of an IBC redundancy management method and blade controllers 104a-104n house and implement a second portion of the IBC redundancy management. In scenarios where each controller is sending and receiving every data signal, the position of each blade in IBC environment 100 is commanded by control computer 102 and executed by a blade controller 104. However, in some scenarios, where data transmission is imperfect, the position of a blade in IBC environment 100 is both commanded and executed by a blade controller 104. The ability of the blade to receive position commands from multiple sources permits graceful degradation of the rotor system through data transmission failures.

Figure 2:
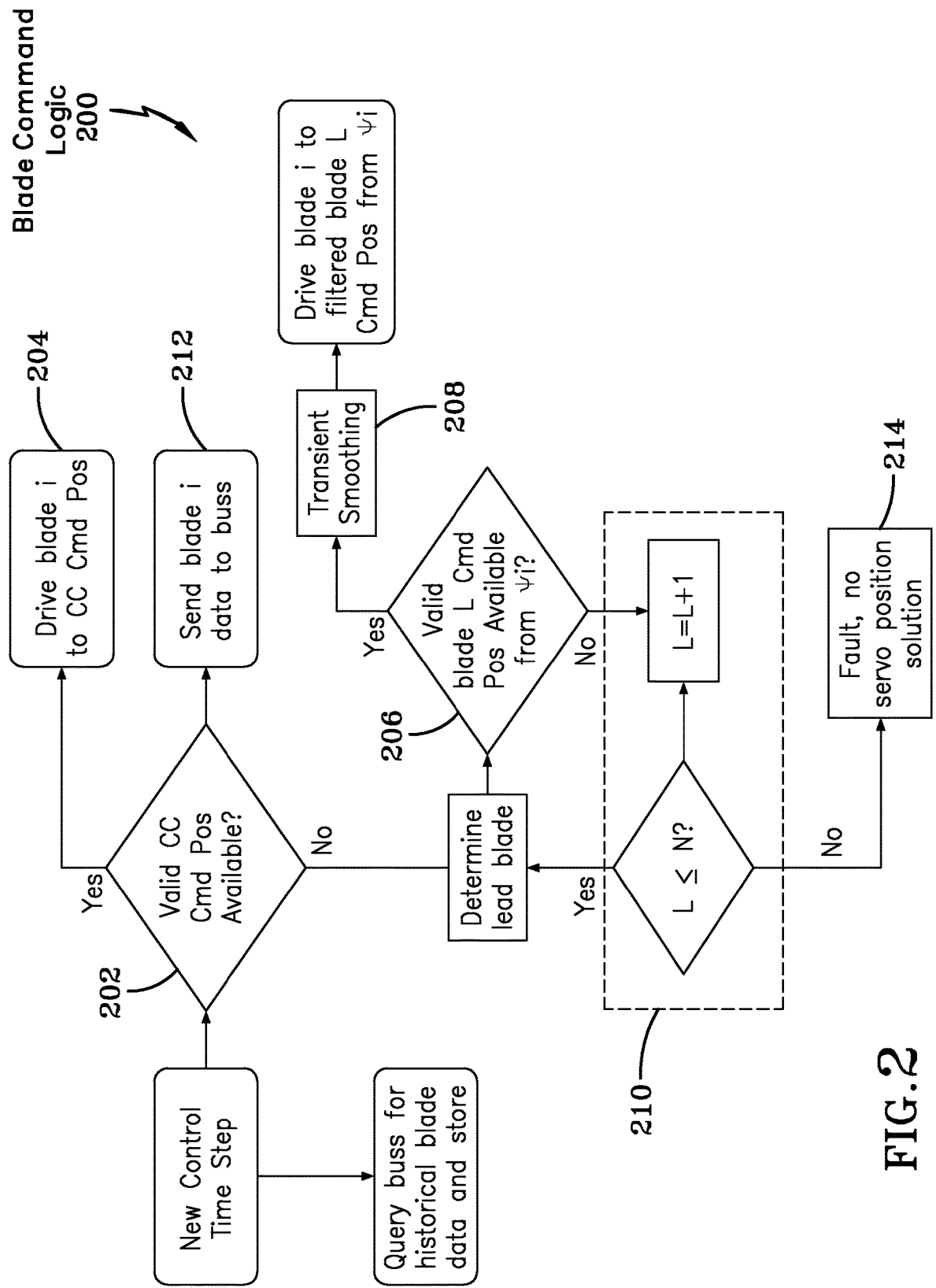
FIG. 2 is a flow diagram depicting a follow the leader blade position command logic at a blade controller.

FIG. 2 is a flow diagram depicting a follow the leader blade position command logic at a blade controller. Blade command logic 200 is housed in blade controllers 104a-104n associated with each blade of IBC environment 100. Blade command logic 200 is evaluated each time a new control time step begins. The steps below are performed by each blade controller 104a-104n at each new control time step. In some embodiments, the following method steps occur for each blade in the system concurrently.

For each of the method steps, the following designations are used. Local blade means the blade being at which the method is actively initiated. Each method step in blade control logic 200 is prescribed from the perspective of a blade controller on the local blade. Lead blade is the blade that local blade references for historical positions. Therefore, lead blade can vary throughout the method.

In step 202, blade controller 104 of the local blade checks for a valid blade position command from control computer 102. If a valid blade position command from control computer 102 is available, the local blade is driven (step 204) to the control computer command position. If a valid blade position command from control computer 102 is not available, blade controller 104 determines a lead blade. In some embodiments, the lead blade is based on the sequence of the rotor blades. For example, if the rotor system has three blades and rotates to the right, the initial lead blade is the blade directly to the right of the local blade. In other embodiments, the lead blade may be determined in a manner set by a user.

In step 206, blade controller 104 determines if the lead blade had a valid blade position command when it was last at the azimuth of the local blade. If a valid blade position for the lead blade is available, blade controller 104 applies transient smoothing before driving the local blade to the lead blade command position (step 208). Transient smoothing is intended to prevent abrupt changes in command blade position from one time step to another. Abrupt changes could be caused by differences between a valid blade position command from control computer 102 in one time step, and the historically derived blade position command in the next. The maximum transient would be bounded by the change in time since the historical position. In some embodiments, the transient smoothing is based on a formula pre-populated into the IBC environment. If a valid blade position for the lead blade is not available, blade controller 104 attempts to designate a new lead blade controller.

In step 210, a new lead blade is designated. A new lead blade is designated by looking ahead one blade. For example, in the three-blade system, local blade controller 104a would look to a blade two to its right. Once the new blade controller is designated, blade controller 104 repeats step 206 until a valid historical blade position can be determined. This continues until local blade references every blade in the IBC environment. The time step is completed when each blade, including the local blade historical position from one full rotation prior, has been the lead blade. In the event that no valid historical blade position can be determined, blade controller 104 determines a fault (step 214). In the event that blade controller 104 determines a fault, the blade is instructed to holds its current position. In some embodiments, this could cause a catastrophic failure. In other embodiments, the blade is instructed to hold its current rate. In still other embodiments, the blade is instructed to blend it current rate to zero and then hold its position.

In step 212, in response to steps 204 and 208, the new blade position is sent to the data busses. This new blade position is can be used to determine a valid position for another blade. In response to step 212, the time step is completed and a new time step commences.

Figure 3:
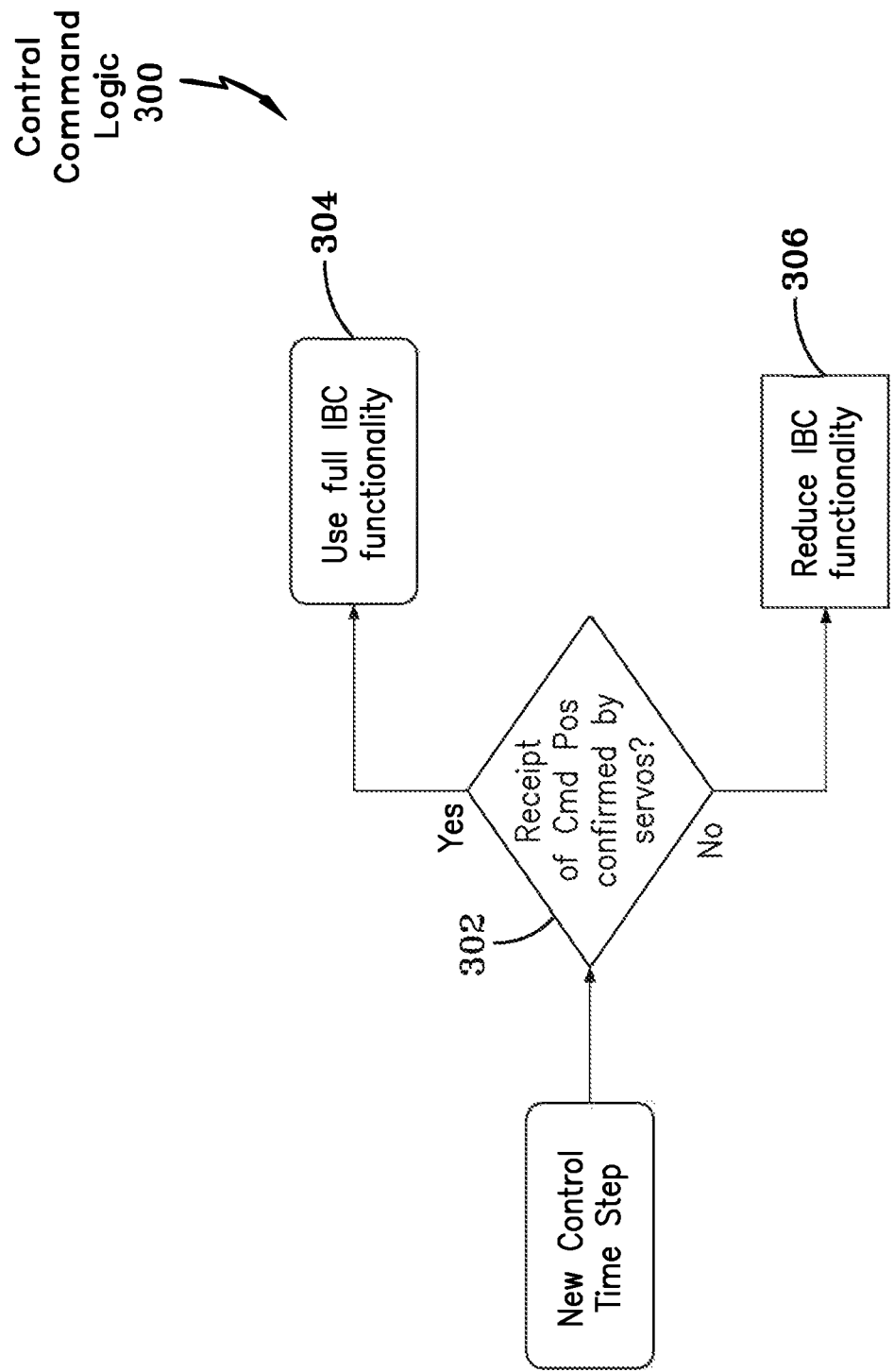
FIG. 3 is a flow diagram depicting a follow the leader blade position command logic at a control computer.

FIG. 3 is a flow diagram depicting a follow the leader blade position command logic at a control computer. Control command logic 300 is housed and executed by control computer 102. Control command logic is executed for each new time step.

In step 302, control computer 102 determines if blade controller 104 has received a valid command position available for local blade 104a. If receipt of a valid command position is confirmed, the local blade 104a is driven to position of the control computer command position (step 304). If receipt of a valid command position is not confirmed, the control system is instructed to reduce the IBC functionality (step 306). In some embodiments, the equation $\overline{\omega}_{BW,max}=2\pi/(\Psi_L-\Psi_i)*\Omega_R$ is used to calculate the maximum bandwidth frequency for all servo control commands generated by the larger control system. The $\overline{\omega}_{BW,max}$ the effective control lag induced by using the historical blade position. The $\Psi_L$ is the current azimuth of the lead blade in radians. The $\Psi_i$ is the current azimuth of the local blade in radians. The $\Omega_R$ is the rotational angular velocity in radians per second.

The above description is that of current embodiments of the invention. Various alterations and changes can be made without departing from the spirit and broader aspects of the invention as defined in the appended claims.

What is claimed is:

1. A method for redundancy management of an individual blade control rotor system, the method comprising:
   a series of control time steps for the individual blade control system, wherein the individual blade control system comprises a control computer and a plurality of blades, and wherein during each time step:
   a blade controller of a local blade queries a first blade position from a control computer;
   in response to an invalid first blade position, the blade controller of the local blade determines a lead blade;
   the blade controller of the local blade queries a second blade position from a blade controller of the lead blade.

2. The method of claim 1, wherein in response to receiving the second blade position from the blade controller of the lead blade, the blade controller of the local blade determines the validity of the second blade position.

3. The method of claim 2, wherein the second blade position is valid:

the blade controller of the local blade performs transient smoothing; and
the blade controller of the local blade drives the local blade to the second blade position.

4. The method of claim 2, wherein the second blade position is invalid:
   the blade controller for the local blade identifies a new lead blade; and
   the blade controller for the local blade queries a third blade position from the new lead blade.

5. The method of claim 1, in response to a valid blade position, the blade controller for the local blade transmits the valid blade position to the control computer and a plurality of blade controllers associated with the plurality of blades.

6. A system for redundancy management of individual blade controller rotor system, the system comprising:
   a stationary frame and a rotary frame;
   the stationary frame comprises at least one control computer;
   the rotary frame comprises a rotating rotor hub and a plurality of blade controllers; and
   a slip ring providing an interface between the stationary frame and the rotary frame, where data is transferred amongst the plurality of blade controllers, and wherein data is transferred between the plurality of blade controllers and the at least one control computer.

7. The system of claim 6, wherein each blade controller of the plurality of blade controllers accepts and transmits information from the at least one control computer.

8. The system of claim 6, wherein each blade controller of the plurality of blade controllers accepts and transmits information from the plurality of blade controllers.

9. The system of claim 6, wherein a position of a first blade controller of the plurality of blade controllers is determined from a historical position of a second blade controller of the plurality of blade controllers.

10. The system of claim 6, wherein each of the plurality of blade controllers corresponds to a blade of a rotor system.

\* \* \* \* \*